United States Patent [19]
Kang et al.

[11] Patent Number: 5,886,704
[45] Date of Patent: Mar. 23, 1999

[54] SYSTEM AND METHOD FOR EXPLORING LIGHT SPACES

[75] Inventors: Ho Min Kang, Neward, Del.; Joseph Marks, Belmont, Mass.; Joshua Seims, New York, N.Y.; Stuart Merrill Shieber, Cambridge, Mass.

[73] Assignee: Mitsubishi Electric Information Technology Center America, Inc., Cambridge, Mass.

[21] Appl. No.: 646,739

[22] Filed: May 3, 1996

[51] Int. Cl.[6] .................................................. G06T 15/50
[52] U.S. Cl. ............................................................ 345/426
[58] Field of Search .......................... 395/126; 345/426, 345/418–20, 431, 433, 332, 334; 364/578

[56] References Cited

U.S. PATENT DOCUMENTS

| 5,307,295 | 4/1994 | Taylor et al. | 364/578 |
|---|---|---|---|
| 5,566,283 | 10/1996 | Modegi et al. | 395/126 |
| 5,659,671 | 8/1997 | Tannenbaum et al. | 395/126 |

OTHER PUBLICATIONS

Picott et al., "Extensions of the Linear and Area Lighting Models," IEEE Computer and Applications Magazine, Mar. 1992, vol. 12, No. 2, pp. 31–38.

Li et al., "A New Lighting Model for Computer Graphics," Circuits and Systems, IEEE 1991 China International Conference, Jun. 1991, pp. 805–807.

Belhumeur et al., "What is the Set of Images of an Object Under All Possible Lighting Conditions?" Computer Vision and Pattern Recognition, Jan. 1996, pp. 270–277.

Strauss, "A Realistic Lighting Model for Computer Animators," IEEE Computer Graphics and Applications Magazine, Nov. 1990, vol. 10, No. 6, pp. 56–64.

MacNichol, "The art of lighting," Computer Graphics World, Dec. 94, vol. 17, No. 12, p. 45(5).

King, "Simulating sunlight: Autodesk's World–Creating Toolkit lighting techniques," Computer Graphics World, Jun. 95, vol. 18, No. 6, p. 70(2).

POV–Ray, a copyrighted rendering engine software application by Persistence of Vision Development Team, 1991–1997. (POV–Ray is "Freeware," which can be download from the Internet at http://www.povray.org). Jan. 1991.

POV–Ray, "On–Line Help Excerpt," 1996; POV–Ray, On–Line Help Table of Contents, Jan. 1996.

AutoVision, V. 2.0, a software application by Autodesk, Inc., Software Product Specification, Computer Select, Dec. 1995.

Trick of Light, a software application by REMedia,Inc., Software Product Specificaiton, Computer Select, Dec.1 995.

Lightscape Visualization System, V. 1.2, a software application by Lightscape Technologies, Inc., Software Product Specification, Computer Select, Dec. 1995.

OmniPage,Image Assistant, *Carer Corporation, OmniPage Professional Windows Version 5.0, 1993,* pp. 21–27.

*Primary Examiner*—Rudolph J. Buchel, Jr.
*Attorney, Agent, or Firm*—Dirk Brinkman

[57] ABSTRACT

A system and method for creating lighting for an image generates a large number of images based upon randomly selected light positions, types and directions. The images are then culled to reduce the number of images to be reviewed by a user. The images are culled to provide a set of images which best spans the lighting space represented by the large number of images. The culling process is iterative; at each iteration, the image which is most dissimilar from a nearest neighbor in the selected set is added to the selected set. The images are organized in a hierarchical structure to ease review by the user. The hierarchical structure separates the images into multiple levels. At each level, the images are separated into sets of equal size. Each set includes images which are most similar. An average image from each set is picked as the visual representation for that set. In creating the hierarchical structure, a single image may or may not be included in different subsets. A user interface allows the user to review and select images in the hierarchical structure. The images selected by the user are combined to create a final image with lighting. The lighting specifications can be saved for future reference by the lighting system or other applications.

9 Claims, 5 Drawing Sheets

SYSTEM AND METHOD FOR EXPLORING LIGHT SPACES

FIELD OF THE INVENTION

The present invention relates to a system for generating and manipulating lighting in computer displays of scenes. More particularly, it relates to a system for automatically generating lighting sources, eliminating and organizing sources, and interactively selecting sources to provide aesthetic and effective illumination.

BACKGROUND OF THE INVENTION

One of the major difficulties in computer generation of images is lighting design. Initially, objects in a scene are created; then, the lighting of the objects must be determined. Lighting design requires the selection of lights from a light space. The light space includes all possible locations and types of lights, as well as directions for directional lights. Determining light locations, types and directions to use for a specific lighting effect can be a tedious process.

Under one approach, as each light is added to the scene, an image is rendered again. The user must be able to specify all of the lighting parameters for each of the lights. The user must also evaluate the lighting and specify any changes to the lights in order to change the lighting effects. Thus, the user must be experienced in lighting design and must be able to determine desired placements for lights. This process can be extremely time consuming. If sophisticated rendering programs, such as ray tracing or radiosity, are used, production of an image based upon the lights takes considerable time. The image rendering process must be repeated each time that the lights are changed.

Another approach attempts to determine lighting parameters automatically to achieve a specified lighting effect. The user must be able to articulate desired illumination characteristics of an image. Again, this requires a sophisticated user experienced in lighting design. It also requires a user who can formulate lighting objectives in an understandable format. In addition to requiring a sophisticated user, existing computer systems and processes which determine lights from the desired illumination limit the lighting possibilities for an image.

For example, "Radioptimization—goal-based rendering", Proceedings of SIGGRAPH 93, pp. 147–54, by Messrs. Kawai, Painter, and Cohen, describes a system for determining lights from subjective impressions of illumination entered by a user. The system uses optimization techniques to determine optimum lighting parameters to meet the entered illumination impressions. However, the user must enter a limited set of possible light positions, which severely limits the region of the lighting space which is considered. Similarly, Messrs. Schoeneman, Dorsey, Smits, Arvo and Greenberg disclose a system in "Painting with Light", Proceedings of SIGGRAPH 93, pp.143–46, which uses optimization techniques to determine lights to achieve certain pixel intensity levels entered by the user. This system requires the user to be able to input the pixel intensity levels for the entire image. It also requires a limited set of light positions to be entered by the user in order to determine the optimum lights.

Another system, disclosed in Poulin and Fournier, "Lights from Highlights and Shadows", Proceedings of the 1992 Symposium on Interactive Graphics, pp. 31–38, allows the user to specify the desired locations of highlights and shadows. This system uses geometric techniques to determine optimum light positions and types in order to achieve the desired highlights and shadows. As with the previously discussed systems, this system requires a sophisticated user who has a set lighting pattern in mind. Adjustments to the specified lighting pattern have to be reprocessed in order to determine a new set of light positions.

Therefore, a need exists for a system for creating image lighting which is easily manipulable by the user to obtain a desired result. A need exists for a system which allows changes in lights to be easily computed for review by the user. A need exists for a system which allows a large set of light positions and types to be considered and combined. Finally, a need exists for a system which is usable by persons having limited experience in lighting design.

SUMMARY OF THE INVENTION

The deficiencies of existing light specification systems are substantially overcome by a system for exploring lighting spaces according to the present invention. The system of the present invention generates a large number of potential lights sources and creates images using each light source. The images are used to reduce the number of potential lights and to organize the light sources for review by the user.

According to one aspect of the invention, a large number of potential light sources are generated randomly over an identified set of surfaces. Low resolution images are generated for each individual light source.

According to another aspect of the invention, the low resolution images are used to eliminate various lights. Lights having an illumination level below a threshold are removed. Then a subset of the lights is selected whose members are maximally complementary to each other. A higher resolution image is then created for the selected lights.

According to another aspect of the invention, the images corresponding to the selected lights are organized to be easily browsed by the user. Using graph theory, the lights are organized into sets of similar lights; the sets are further divided into lower level subsets of similar lights. A user interface displays the sets to allow selection of the images for specific lights. The user selects a first image from a display of representative images for each set. Representative images of sub sets are then displayed for further selection. Finally, the user can select a specific image for a light. The user may select various images, which are then combined to produce the final image with a desired lighting. Images for lights can be selected, deselected, and assigned combination weights until the desired image is reached.

DETAILED DESCRIPTION

Figure 1:
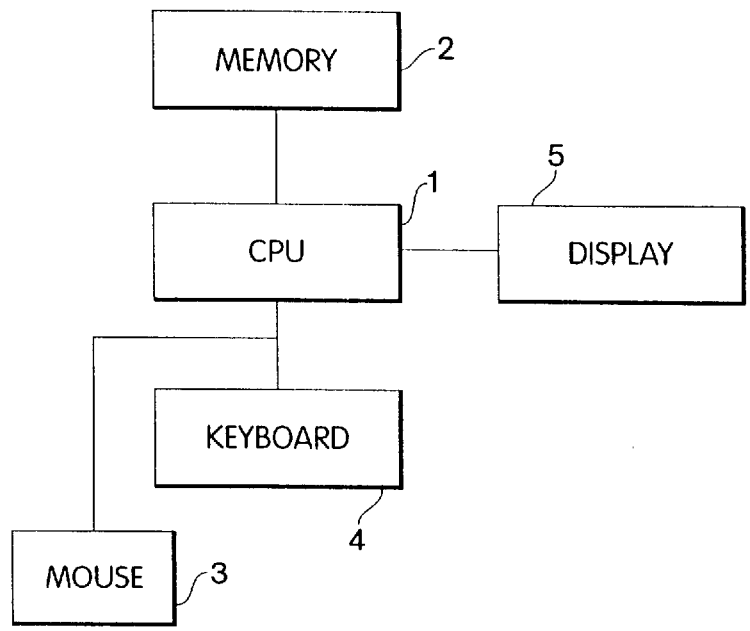
FIG. 1 is a computer system which can be used to implement the present invention.

FIG. 1 illustrates a general computer system useable in connection with the present invention. A memory 2 stores a scene to which the lighting will be applied and data related to the lighting. A central processing unit (CPU) 1 connected to the memory processes the image, generates, eliminates and organized lights and lighted images, and operates a user interface with which the user select lights. A display 5 is connected to the CPU 1 to display lighted images in connection with the user interface. The user inputs information through a keyboard 4 or mouse 3 to set lighting parameters and to operate the interface for lighting selection.

Figure 2:
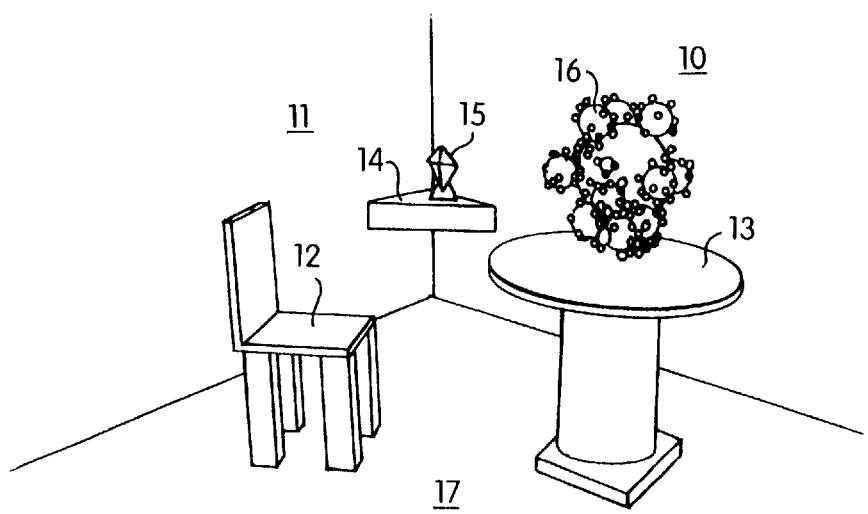
FIG. 2 illustrates a basic image to which the lighting system of the present invention can be applied.
Figure 3:
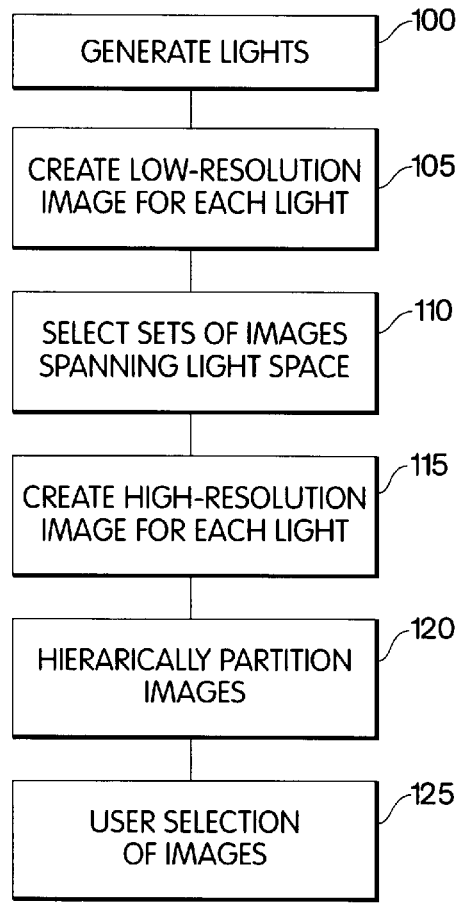
FIG. 3 is a flow diagram of the process of the present invention.
Figure 4:
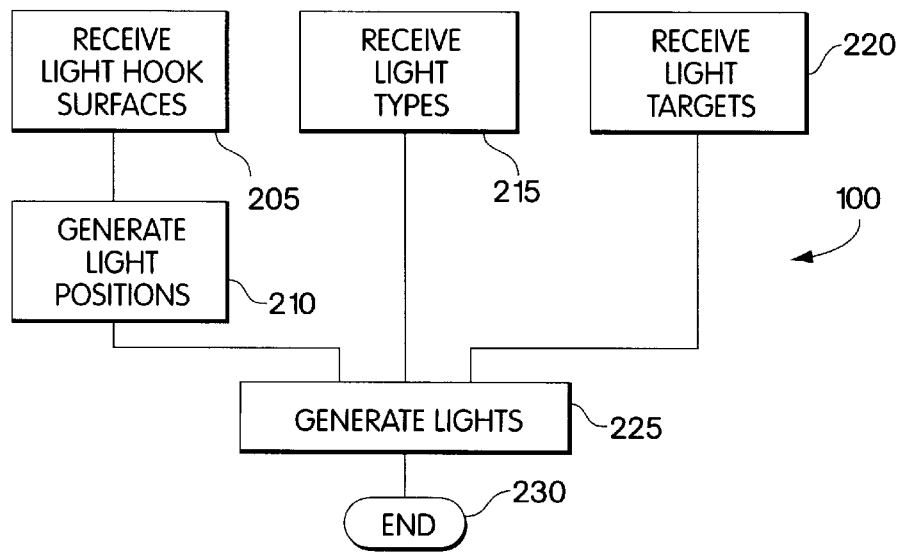
FIG. 4 is a flow diagram of the process of generating lights.

FIG. 3 illustrates the overall process of the present invention for creating lighting for an image. At step 100, the system generates a set of possible lights. The process for creating lights 100 is illustrated in FIG. 4. According to an embodiment of the invention, each light includes up to three parameters which represent the light: a position, a light type, and a light-target. The position represents a location within the image scene, it may be within the scene or from outside the scene. Light positions are determined based upon light-hook surfaces. The user inputs the light-hook surfaces (step 205) and then the system generates light positions at random locations on those surfaces (step 210). FIG. 2 illustrates an image which can be illuminated with the present invention. The image includes two walls 10, 11 and a floor 17. Any of these may be a light-hook surface. Additionally, the scene inherently includes two other walls and a ceiling, which are not within the view. These may also be light-hook surfaces.

At least one light type is generated for each light position. Different light types have different illumination characteristics. Light types might include point lights, area lights, and spot lights of different beam angles. The user can input the different light types (step 205) which can be used. The system may generate each of the light types at each location, or may randomly select light types for each location from the set of entered types.

For directional lights, such as spot lights, the direction information is provided in the form of a position for the light to face. The user can input light-target surfaces. The directional light will be automatically generated to point to a random location on a light-target surface. In the illustration of FIG. 3, the chair, table, object on the table, shelf, or object on the shelf may be the light-target. Alternatively, the walls, floor and ceiling, whether in the image or behind the viewer might operate as light-targets as well.

Additional parameters can be used to define the lights. Furthermore, since the lighting effects are computer generated, the lights do not necessarily comply with characteristics of physical lights and parameters can be used to define characteristics of the lights. For examples, unique dispersion characteristics may be used. A fall-off characteristic of the light, other than quadratic fall-off of physical light, can be used as a parameter. Also, different shadowing effects can be included in the parameters for the lights.

Based upon the light-hook surfaces, light types and light-target surfaces, the system will generate a set of potential lights (step 225). For maximum potential lighting selection, preferably the number of potential lights will be large, such as thousands. Since a user cannot easily review thousands of light images and since many different lights may produce similar illumination effects, the number of potential lights must be reduced. Preferably, the number of lights can be reduced while maintaining the widest set of potential lights in the light space. To do this, low-resolution images are created for each light (step 105, FIG. 3) using ray tracing or any similar techniques. The images are stored in the memory 2. In one embodiment, a low-resolution image has a resolution of 128×100 pixels. A low-resolution image is used to limit the time necessary to create and store the images. The low-resolution images are used to cull the potential lights, at step 110, to select a set S of images which spans the light space. The process for culling the lights is illustrated in FIG. 5.

First, images which have little illumination are removed (step 250). To do this, the pixel intensities for an image are summed. If the total intensity is less than a selectable threshold value, the image-corresponding lights are removed. Second, a set of images are selected which most broadly covers the lighting space. An iterative process is used to select the set of images and lights. At each iteration, an image is selected which has pixel intensity values which differ most from a closest image in the set of images already selected. The iterative process is repeated until a predetermined number of images have been selected. Since each newly selected image differs the most from the complete set of selected images, the final set best spans the space of potential lights.

Figure 5:
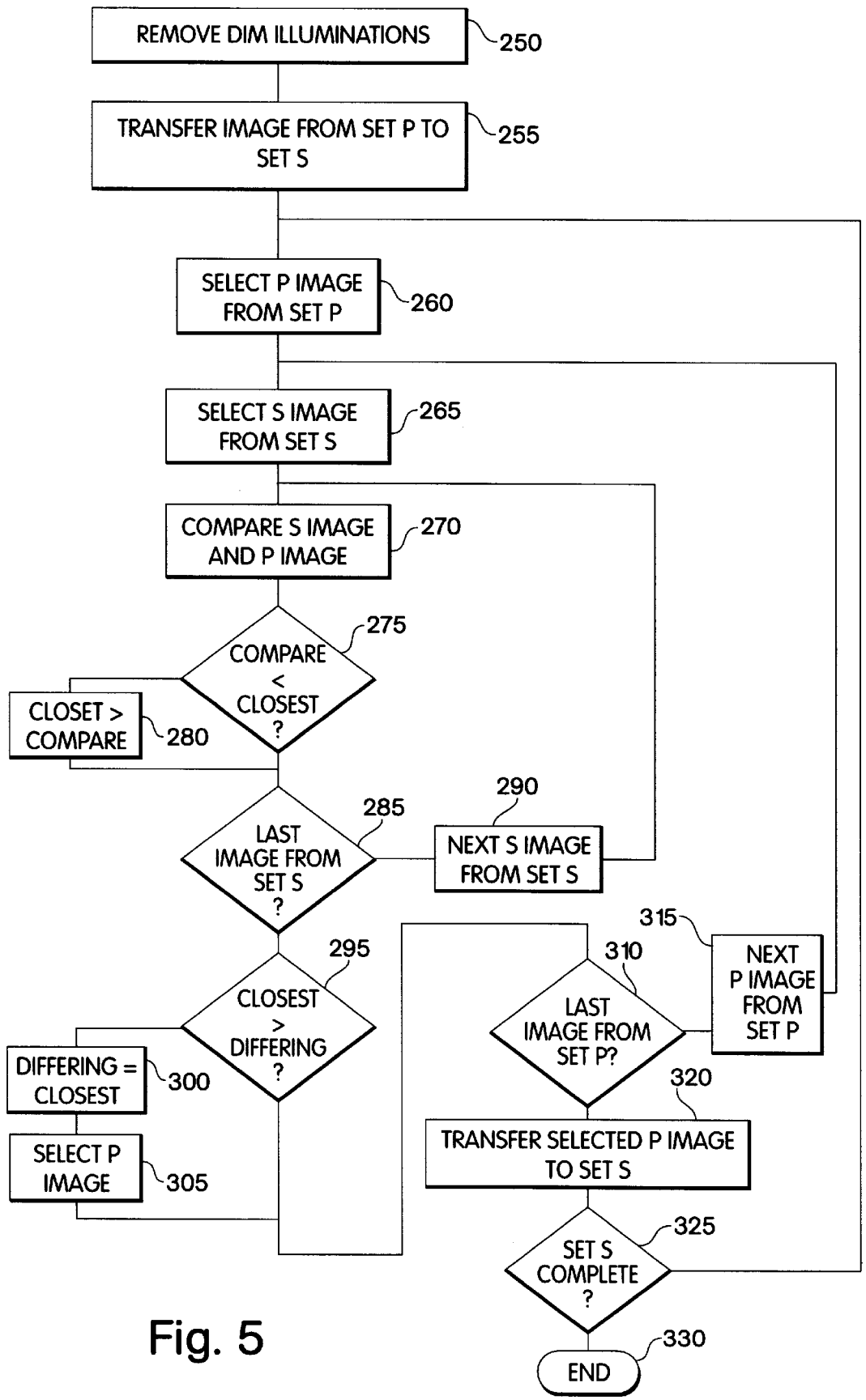
FIG. 5 is a flow diagram of the process of selecting a spanning set of lights.
Figure 6:
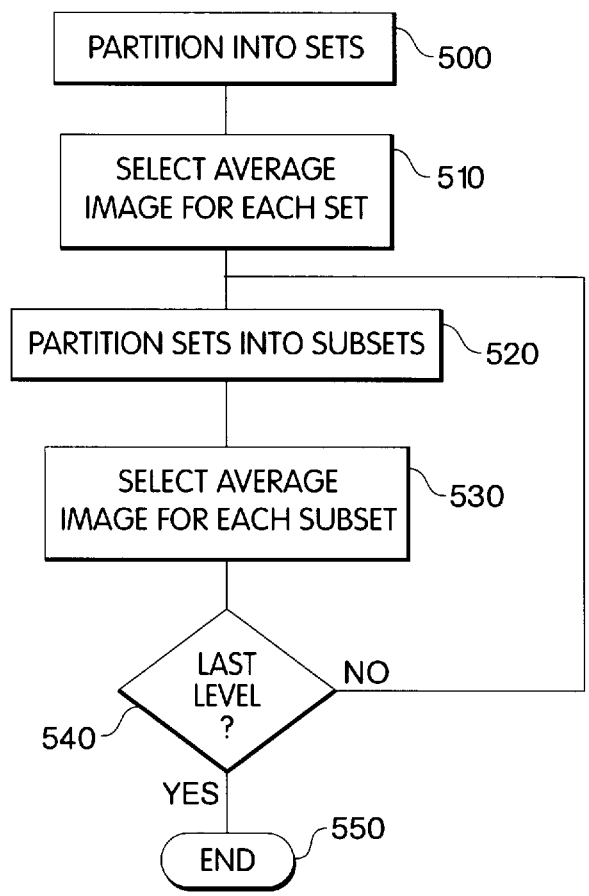
FIG. 6 is a flow diagram of the process for organizing the lights in the spanning set.

Possible steps for performing the iterative process are illustrated in FIG. 5, steps 255 to 325. In this figure, set P refers to the set of images for potential lights which have not yet been selected; each image in the set P is referenced as a P image. Set S refers to the set of images which have been selected and each image in set S is referenced as an S image. A first image is transferred from set P to set S at step 255. The image may be randomly selected or a predetermined one of the images, such as the first image generated. An image is selected from set P and from set S (steps 260 and 265). The S and P images are compared to determine how close they are. Various methods can be used to determine closeness. According to one embodiment of the invention, a difference measure would be used. The difference measure is given by $$\Sigma |(Y_S(x,y) - Y_P(xy))| \quad [1]$$

where Y(x,y) is the luminance level of the pixel at location x,y in the image. Other measures, such as an inner product of the light image vectors, can alternatively be used to judge closeness. The comparison value is compared to a closest value (step 275), and closest gets the value of the comparison, if it is smaller (step 280). The comparing step and adjustment of the closest value is repeated for each image in set S. The iterative process shown in steps 265–290 represents determining the least difference between each P image and a corresponding closest image in set S. This process is repeated for each image in set P to determine the least difference between the closest image in set S and each P image. The P image which differs most from a closest S image is determined by steps 295–315. The closest value of a current P image is compared with a differing value at step 295. If the closest value is greater than the differing value, then the differing value is assigned the closest value (step 300) and the current P image is selected (step 305). The closest value represents the best similarity between a currently selected P image and the closest image in set S. If the current P image is more different than any of the previously considered images, it becomes the selected image. After all of the P images have been considered, the selected P image is transferred to set S at step 320. The entire process is repeated until set S is complete (step 325), i.e., a predetermined number of images have been selected from set P. According to an embodiment of the invention, set S would include 584 lights.

Once a set of images of a predetermined size which best span the entire lighting space has been selected, high-resolution images are created for each light corresponding to the set of images at step 115 (FIG. 3). According to an embodiment of the invention, the images have a resolution of 512×400 pixels. The high-resolution images may require more time to generate than the low-resolution images, but permit better closeness comparisons and more accurate review by a user.

The number of remaining lights are still large in relation to the capability of a user to review them. Therefore, the lights are hierarchically partitioned and organized at step 120 to permit efficient review. Various methods can be used to partition and organize the images. A specific graph theory process described in U.S. Pat. No. 3,617,714, incorporated herein by reference, can be used for partitioning the images into sets. Using this graph theory process, the vertices are the images and the costs of interconnections are the similarity values of the images. As with the culling process, the similarity of images is measured by the difference value of equation [1] from the high-resolution images. Of course, other measures of similarity could also be used. In one embodiment, each image is included in only one set. Alternatively, each image may be included in multiple sets.

An image representative of each set is selected at step 510. One method for determining a representative image is to select the one that has the lowest average difference with respect to the other images in the set. After the representative image is selected, the remaining images in each set are further partitioned into subsets of similar images, again using the graph theory process (step 520), and a representative image for each subset is selected (step 530). The steps of partitioning into subsets and selecting of representative images are repeated for each level of the hierarchy.

According to an embodiment of the invention, the hierarchy includes 584 images organized into three levels. With this hierarchy, the 584 images are partitioned into eight sets of 73 images each (step 500). Once a representative image is selected (step 510), each set is partitioned into eight subsets of nine images each (step 520). When a representative image is selected from each subset (step 530), eight images remain for each subset at the third level of the hierarchy.

Figure 7:
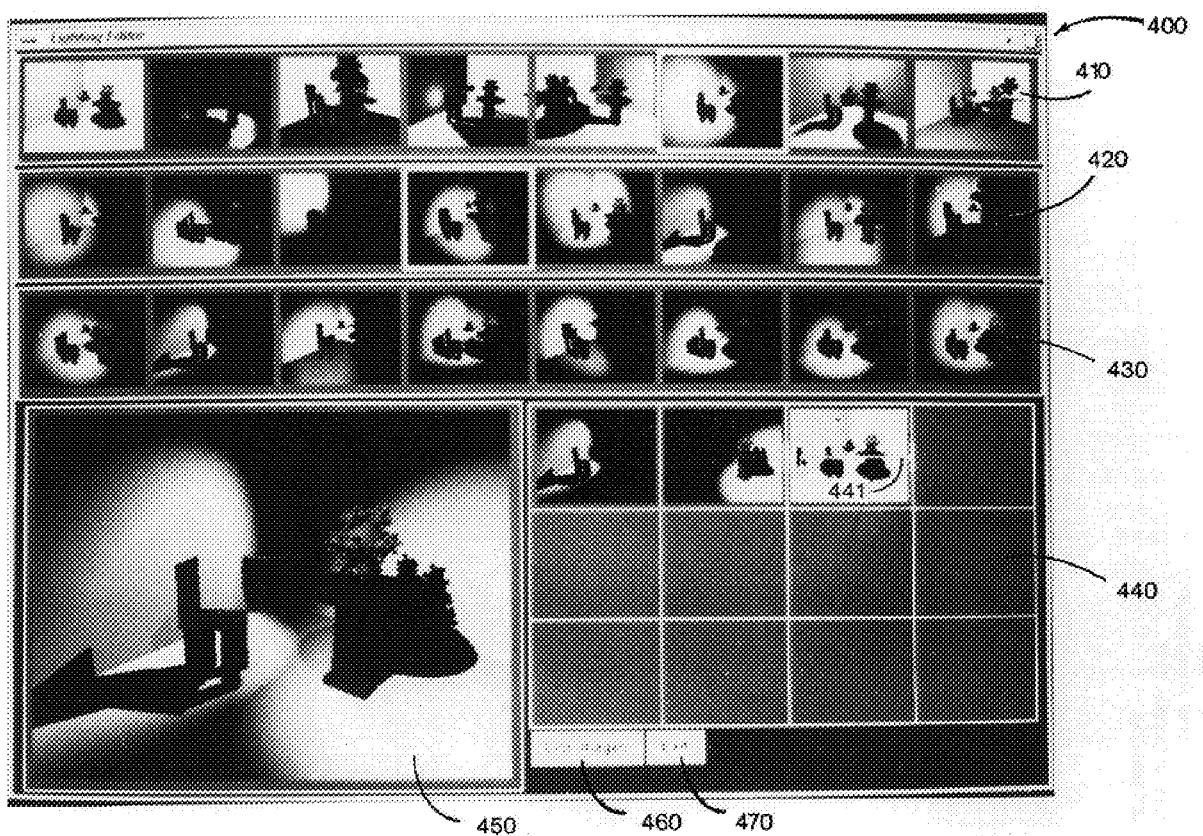
FIG. 7 illustrates a user interface used to select lights according to the present invention.

FIG. 7 illustrates a user interface useful by a user for reviewing the organized images, selecting and combining images. The interface includes a set of hierarchy image levels 410, 420, 430, a palette of selected lights 440, and a full-sized combined image 450 on the display 5. The images for the first level in the organized hierarchy are displayed on a first row 410. The user can then select one of these images using the keyboard 4 or mouse 3. Once a first level image is selected, the images below it at the next lower level in the hierarchy are displayed at the second row 420. The user can then select one of the images in the second row, which causes the lights at the next lower level below the selected light in the hierarchy to be displayed in the third row 430. Although the interface is illustrated with three rows of eight images each, any number of rows, and correspondingly any number of levels in light image hierarchy, can be used. The number and sizes of rows determines the size of set S in the culling process. With three levels of eight images each, 584 lights are selected. If images can be included in multiple subsets, a fewer number of images can be selected.

Any of the displayed images may be selected to be included in the palette of selected lights 440, by using a drag-and-drop technique with the mouse 3, or other method. The selected lights in the palette are then combined to create the full sized combined image 450. The combined image can be created relatively quickly using the additive nature of light based upon the high-resolution images previously generated. A method for combining lights is discussed in J. Dorsey, J. Arvo, and D. Greenberg, "Interactive Design of Complex Time-dependent Lighting", IEEE Computer Graphics and Applications, pp. 26–36 (Mar. 1995), incorporated herein by reference. A slider scale 441 can be used to adjust the contribution of the light for each image to the combined image. Although FIG. 7 illustrates white lights, colored lights could also be used. The interface can display a palette for the user to select a color for each light in the selected palette of lights 440.

The system of the present invention is not limited to determining lighting for images. The general principle of the process can be applied to problems, such as parameter selection for fractal, graftal, and other generative modeling processes; specification of the reflective and textural properties of surfaces; the color and opacity attributes of volume data; motion synthesis for animation; and layout of 2D informational graphics. Parameters of the image feature to be selected are randomly set for a large number of potential values. Images are then generated for each of the different values of the parameters. The images can then be culled and organized for review and selection by a user. Of course, the difference equation [1] for lighting does not necessarily distinguish between images which vary with respect to a different feature. The difference equation which is used to distinguish images will depend upon the feature being selected. Also, the mechanism for combining images might vary based upon the feature being selected.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A system for adding lighting to a scene comprising:

light generation means for providing a plurality of images of said scene with lighting at a number of randomly selected light positions, types and directions, said lighting based upon an original scene;

culling means for automatically selecting a set of images of said scene, each illuminated differently as a result of said number of randomly selected light positions, types and directions, thus to provide images of the same scene having different illumination, with said set having the greatest variety of illumination effects, said set having been formed in an iterative process starting with a nascent set in which at each iteration the unselected light whose illumination effect is most dissimilar to the illumination effect of light already in the nascent set is selected and is then included in the nascent set, said iteration then repeated if needed, thus to provide a set of images which best spans the lighting space represented by said plurality of images, whereby a set having the greatest variety of illumination effects is provided;

means for selecting at least one of said plurality images; and means for displaying an image formed from said at least one of said plurality of images.

2. A system for adding lighting to a scene comprising:

light generation means for providing a plurality of images of said scene with lighting based upon an original scene and data regarding a plurality of lights;

culling means for automatically selecting a set of images of said scene, each illuminated differently thus to provide image of the same scene having different illumination with said set having the greatest variety illumination effects;

means for selecting at least one of said plurality images; and, means for displaying an image formed from said at least one of said plurality of images, said light generation means including:

means for selecting at least one light-hook surface in said scene;

means for selecting at least one light type;

position means for randomly selecting a plurality of light positions at a location on said at least one light-hook surface;

type means for selecting one light type for each light position selected by said position means; and image generation means for generating said plurality of images, each of said images being based upon said original scene one of said light positions and a corresponding light type.

3. The system for adding lighting to a scene according to claim 2, wherein said image generation means generates said images using image-rendering techniques.

4. The system for adding lighting to a scene according to claim 2, wherein said light generation means further includes:

means for selecting at least one light-target surface; and direction means for randomly selecting a target position at a location on said at least one target surface corresponding to each light type selected by said type means which is a directional light.

5. The system for adding light to a scene according to claim 1, wherein said culling means includes:

means for determining an illumination level for each of said images; and means for deleting images which have an illumination level below a predetermined threshold.

6. A system for adding lighting to a scene comprising:

light generation means for providing a plurality of images of said scene with lighting based upon an original scene and data regarding a plurality of lights;

culling means for automatically selecting a set of images of said scene, each illuminated differently thus to provide image of the same scene having different illumination with said set having the greatest variety of illumination effects;

means for selecting at least one of said plurality images; and, means for displaying an image formed from said at least one of said plurality of images, said light generation means including:

means for selecting a first image for said set from said plurality of images and removing said first image from said plurality of images;

difference means for determining a difference for each of said images, said difference representing a smallest difference between each of said images and images in said set; and means for selecting one of said images having a greatest difference for said set and removing said selected image from said plurality of images.

7. The system of adding lighting to a scene according to claim 1, wherein said selection means includes:

means for organizing said images in a hierarchical structure;

means for displaying images in said hierarchical structure based upon user selection of an image at a higher level in said hierarchical structure; and means for selecting one of said images displayed based upon user input.

8. A system for adding lighting to a scene comprising:

light generation means for providing a plurality of images of said scene with lighting based upon an original scene and data regarding a plurality of lights;

culling means for automatically selecting a set of images of said scene, each illuminated differently thus to provide image of the same scene having different illumination with said set having the greatest variety of illumination effects;

means for selecting at least one of said plurality images; and, means for displaying an image formed from said at least one of said plurality of images, said means for displaying an image including means for selecting a weight for each selected image, and wherein said means for displaying an image forms said image by additively combining said selected images, each in proportion to selected weights.

9. A method for adding lighting to a scene comprising the steps of:

providing a plurality of images of said scene with lighting at a number of randomly selected light positions, types and directions, said lighting based upon an original scene;

automatically selecting a set of images of said scene by culling, each illuminated differently as a result of said number of randomly selected light positions, types and directions, thus to provide images of the same scene having different illumination, with said set having the greatest variety of illumination effects, said set having been formed in an iterative process starting with a nascent set in which at each iteration the unselected light whose illumination effect is most dissimilar to the illumination effect of light already in the nascent set is selected and is then included in the nascent set, said iteration then repeated if needed, thus to provide a set of images which best spans the lighting space represented by said plurality of images, whereby a set having the greatest variety of illumination effects is provided;

selecting at least one of said plurality images; and displaying an image formed from said at least one of said plurality of images.

* * * * *